United States Patent
de Diego et al.

(10) Patent No.: US 9,896,945 B2
(45) Date of Patent: Feb. 20, 2018

(54) PROCESS OF PRODUCING A CERAMIC MATRIX COMPOSITE TURBINE BUCKET, INSERT FOR A CERAMIC MATRIX COMPOSITE TURBINE BUCKET AND CERAMIC MATRIX COMPOSITE TURBINE BUCKET

(71) Applicant: GENERAL ELECTRIC COMPANY, Schenectady, NY (US)

(72) Inventors: Peter de Diego, Saluda, NC (US); John McConnell Delvaux, Fountain Inn, SC (US); Glenn Curtis Taxacher, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 968 days.

(21) Appl. No.: 14/088,612

(22) Filed: Nov. 25, 2013

(65) Prior Publication Data

US 2015/0147184 A1 May 28, 2015

(51) Int. Cl.
| | |
|---|---|
| *C04B 35/71* | (2006.01) |
| *F01D 5/28* | (2006.01) |
| *F01D 5/08* | (2006.01) |
| *F01D 5/18* | (2006.01) |
| *C04B 35/573* | (2006.01) |
| *C04B 35/65* | (2006.01) |

(Continued)

(52) U.S. Cl.
CPC ............ *F01D 5/282* (2013.01); *C04B 35/573* (2013.01); *C04B 35/65* (2013.01); *C04B 35/806* (2013.01); *F01D 5/081* (2013.01); *F01D 5/18* (2013.01); *F01D 5/284* (2013.01); *F01D 5/3007* (2013.01); *F05D 2300/6033* (2013.01)

(58) Field of Classification Search
CPC ..... C04B 35/573; C04B 35/65; C04B 35/806; C04B 2235/616
See application file for complete search history.

(56) References Cited

U.S. PATENT DOCUMENTS

| | | | |
|---|---|---|---|
| 5,403,153 | A | 4/1995 | Goetze |
| 5,582,784 | A | 12/1996 | Daws |

(Continued)

FOREIGN PATENT DOCUMENTS

EP 1623776 A2 2/2006

*Primary Examiner* — Erin Snelting
(74) *Attorney, Agent, or Firm* — McNees Wallace & Nurick LLC

(57) ABSTRACT

A process of producing a ceramic matrix composite turbine bucket, an insert for a ceramic matrix composite turbine bucket, and a ceramic matrix composite turbine bucket are disclosed. The process includes providing a bucket preform having a dovetail cavity, the dovetail cavity being enclosed within a dovetail shank of the bucket preform, positioning an insert within the dovetail cavity, then forming the ceramic matrix composite turbine bucket in a furnace. The insert includes a geometry configured to be fit within a dovetail cavity of the ceramic matrix composite turbine bucket, a bucket preform, or both. The insert is foam material or a plurality of ceramic matrix composite plies. The ceramic matrix composite turbine bucket includes a dovetail shank and a dovetail cavity enclosed within the dovetail shank. The dovetail cavity is arranged and disposed for receiving an insert.

16 Claims, 3 Drawing Sheets

(51) Int. Cl.
*C04B 35/80* (2006.01)
*F01D 5/30* (2006.01)

(56) References Cited

U.S. PATENT DOCUMENTS

| | | | | |
|---|---|---|---|---|
| 5,993,725 A * | 11/1999 | Zuk | ............. | B28B 3/003 |
| | | | | 264/635 |
| 6,274,078 B1 * | 8/2001 | Dunyak | ............. | B22C 1/00 |
| | | | | 264/232 |
| 6,428,740 B2 * | 8/2002 | Dunyak | ............. | B22C 1/00 |
| | | | | 264/271.1 |
| 6,544,003 B1 | 4/2003 | Grylls et al. | | |
| 6,648,596 B1 | 11/2003 | Grylls et al. | | |
| 6,755,619 B1 | 6/2004 | Grylls et al. | | |
| 6,786,696 B2 * | 9/2004 | Herman | ............. | F01D 5/147 |
| | | | | 416/193 A |
| 8,475,132 B2 * | 7/2013 | Zhang | ............. | F01D 5/147 |
| | | | | 416/225 |
| 8,980,435 B2 * | 3/2015 | de Diego | ............. | C04B 37/001 |
| | | | | 416/241 B |
| 9,050,769 B2 * | 6/2015 | Monaghan | ............. | F01D 5/282 |
| 9,249,669 B2 * | 2/2016 | Garcia-Crespo | ............. | F01D 5/147 |
| 2008/0187452 A1 * | 8/2008 | Hall | ............. | B22F 3/1291 |
| | | | | 419/5 |
| 2012/0163985 A1 | 6/2012 | Darkins, Jr. et al. | | |
| 2012/0237355 A1 * | 9/2012 | Zhang | ............. | F01D 5/147 |
| | | | | 416/226 |
| 2012/0266603 A1 | 10/2012 | Uskert et al. | | |
| 2013/0084189 A1 * | 4/2013 | Diego | ............. | C04B 37/001 |
| | | | | 416/241 B |
| 2013/0330189 A1 * | 12/2013 | Garcia-Crespo | ............. | F01D 5/147 |
| | | | | 416/61 |
| 2014/0193577 A1 * | 7/2014 | Monaghan | ............. | F01D 5/282 |
| | | | | 427/248.1 |
| 2015/0044054 A1 * | 2/2015 | Loftus | ............. | G01P 15/18 |
| | | | | 416/220 R |

\* cited by examiner

PROCESS OF PRODUCING A CERAMIC MATRIX COMPOSITE TURBINE BUCKET, INSERT FOR A CERAMIC MATRIX COMPOSITE TURBINE BUCKET AND CERAMIC MATRIX COMPOSITE TURBINE BUCKET

FIELD OF THE INVENTION

The present invention is directed to ceramic matrix composite materials, processes for producing ceramic matrix composite articles, and inserts for facilitating the production of ceramic matrix composite articles. More specifically, a process of producing a ceramic matrix composite turbine bucket, an insert for a ceramic matrix composite turbine bucket, and a ceramic matrix composite turbine bucket arranged and disposed for receiving an insert in a dovetail cavity.

BACKGROUND OF THE INVENTION

Large ceramic matrix composite blades/buckets are difficult to produce. Due to densification, the root shank produced can exhibit excessive variation due to complexity of the geometry. Such limitations prevent the use of certain techniques for producing large blades/buckets. In addition, such limitations can increase ply lay-up time, thereby increasing production costs. Use of a large number of plies can also result in higher weight, a need for complex ply slicing and/or patterns, as well as other drawbacks.

In addition, production of blades/buckets prevents inspection and/or monitoring of interior portions of the root shank. Such limitations prevent simple confirmation of adequacy of melt infiltration to portions deep within the root shank and/or prevent determinations of uniformity of such melt infiltration.

To remedy such issues, melt infiltration processes have been modified.

A process of producing a ceramic matrix composite turbine bucket, an insert for a ceramic matrix composite turbine bucket, and a ceramic matrix composite turbine bucket arranged and disposed for receiving an insert in a dovetail cavity that do not suffer from one or more of the above drawbacks would be desirable in the art.

BRIEF DESCRIPTION OF THE INVENTION

In an embodiment, a process of producing a ceramic matrix composite turbine bucket includes providing a bucket preform having a dovetail cavity, the dovetail cavity being enclosed within a dovetail shank of the bucket preform, positioning an insert within the dovetail cavity, then forming the ceramic matrix composite turbine bucket in a furnace.

In another embodiment, an insert for a ceramic matrix composite turbine bucket includes a geometry configured to be fit within a dovetail cavity of the ceramic matrix composite turbine bucket, a bucket preform, or both. The insert is foam material or a plurality of ceramic matrix composite plies.

In another embodiment, a ceramic matrix composite turbine bucket includes a dovetail shank and a dovetail cavity enclosed within the dovetail shank. The dovetail cavity is arranged and disposed for receiving an insert.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
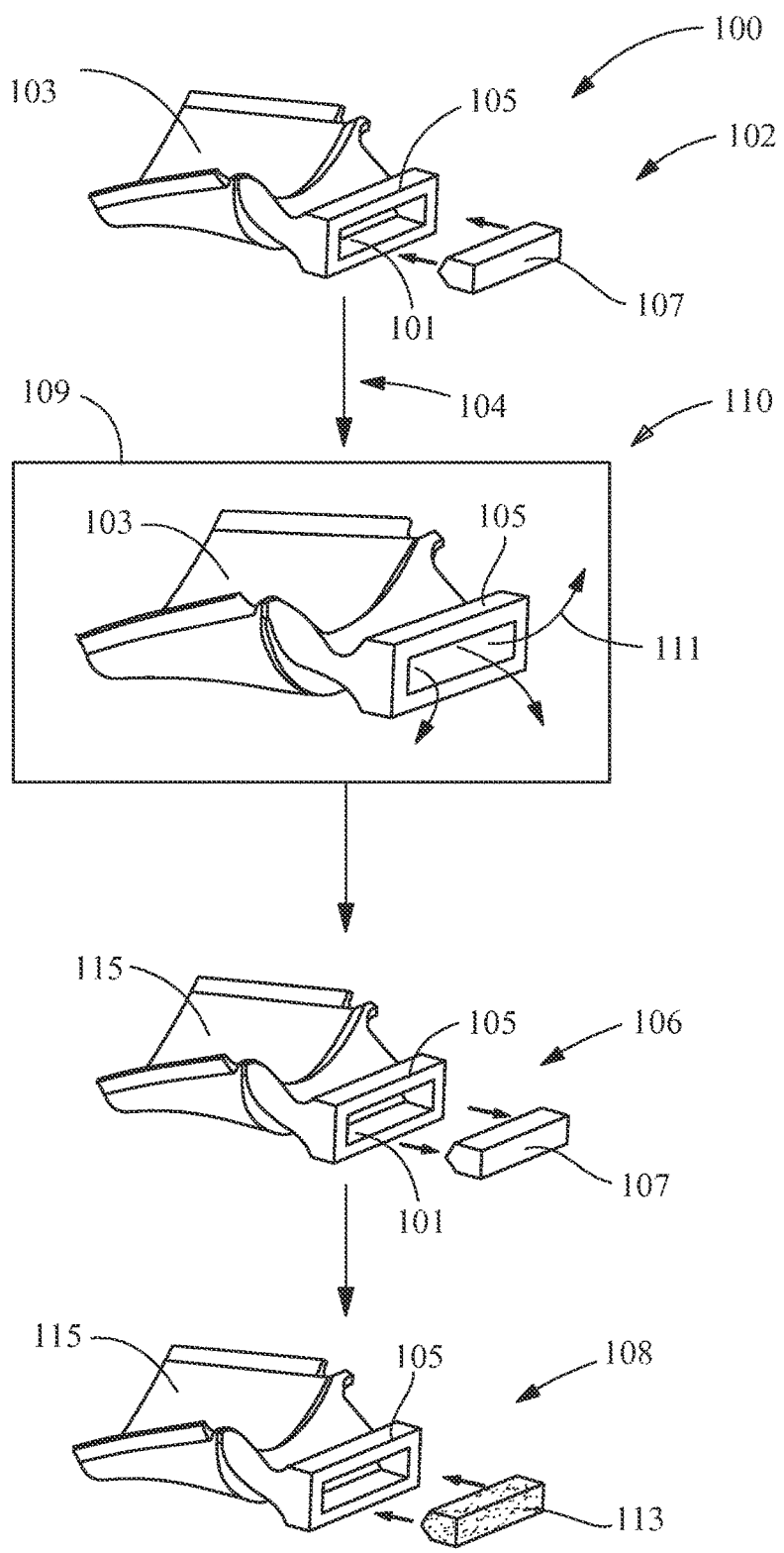
FIG. 1 is a schematic flow diagram of an embodiment of a process of producing an embodiment of a ceramic matrix composite turbine bucket with an embodiment of an insert, according to the disclosure.

Provided is a process of producing a ceramic matrix composite turbine bucket, an insert for a ceramic matrix composite turbine bucket, and a ceramic matrix composite turbine bucket arranged and disposed for receiving an insert in a dovetail cavity. Embodiments of the present disclosure, in comparison to concepts failing to disclose one or more of the features disclosed herein, permit formation of uniform or substantially uniform thickness of dovetail shanks of ceramic matrix composite turbine buckets, permit the prefabrication of portions within a dovetail cavity (the insert) to be monitored and/or inspected, permit fabrication of larger components, reduce material costs and ply lay-up time, simplify manufacturing of thick sections, like root shanks, or combinations thereof FIG. 1 depicts a process 100 of producing a ceramic matrix composite turbine bucket 115 from a bucket preform 103. The term "bucket" is to be considered synonymous with the term "blade." The process 100 includes providing the bucket preform 103 having a dovetail cavity 101, the dovetail cavity 101 being enclosed within a dovetail shank 105 of the bucket preform 103. The process 100 includes positioning an insert 107 within the dovetail cavity 101 (step 102) and positioning the bucket preform 103 in a furnace 109 (step 104).

The process 100 includes any suitable additional steps before or after the positioning of the insert 107 in the bucket preform 103 (step 102) and/or the positioning of the bucket preform 103 in the furnace 109 (step 104). The process 100 includes forming (step 110) of the ceramic matrix composite turbine bucket 115 from the bucket preform 103 within the furnace 109. The forming (step 110) includes heating, compacting, melt infiltration, other suitable formation techniques, or a combination thereof.

In one embodiment, the forming (step 110) includes compacting of the bucket preform 103, for example, within the furnace 109, while the insert 107 is positioned within the furnace 109. The compacting and/or the heating are performed in a single cycle or performed in multiple cycles, with different portions being cured in each cycle or certain portions being partially cured in early cycles. In one embodiment, the heating and/or the compacting of the bucket preform 103 outgases volatilized material 111 from within the bucket preform 103. The volatilized material 111 is absorbed by the insert 107 and/or is expelled through the dovetail cavity 101.

In one embodiment, the process 100 includes removing (step 106) of the insert 107 after the forming (step 110) of the ceramic matrix composite turbine bucket 115. In a further embodiment, the process 100 includes positioning a material 113 differing from the insert 107 within the dovetail cavity 101 (step 108) after the removing (step 106) of the insert 107. Alternatively, in one embodiment, the process 100 includes permitting air to remain in the dovetail cavity 101 after the removing (step 106) of the insert 107.

Figure 2:
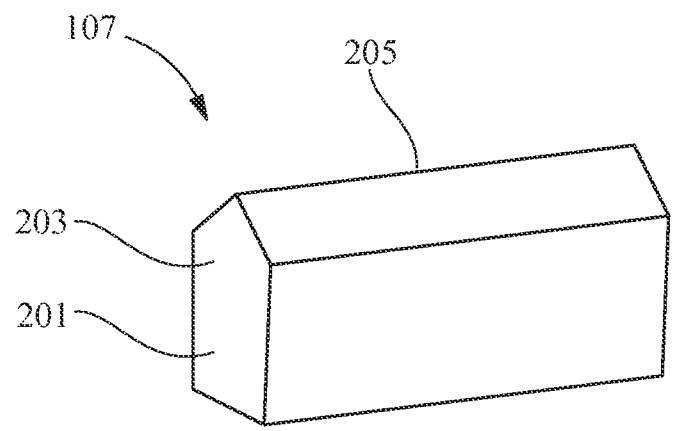
FIG. 2 is an embodiment of an insert for a ceramic matrix composite turbine bucket, according to the disclosure.
Figure 3:
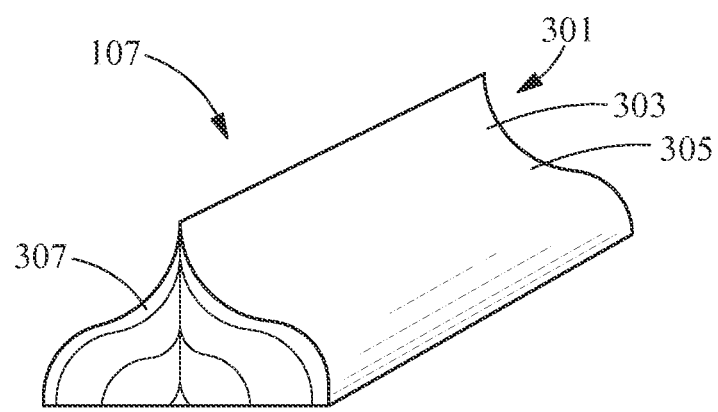
FIG. 3 is an embodiment of an insert for a ceramic matrix composite turbine bucket, according to the disclosure.
Figure 4:
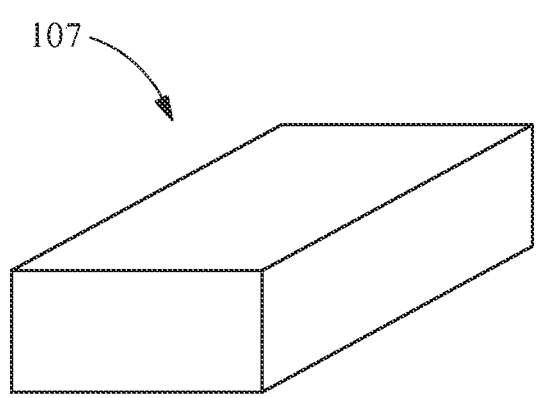
FIG. 4 is an embodiment of an insert for a ceramic matrix composite turbine bucket, according to the disclosure.

The insert 107 is any suitable geometry for the forming (step 110). Referring to FIG. 2, in one embodiment, the insert 107 includes a cuboid region 201 and an angled region 203 forming a point 205 capable of extending into the dovetail cavity 101, such as in a triangular prism, for example, forming a seven-sided geometry with each side being planar. Referring to FIG. 3, in another embodiment, the insert 107 includes a sloping region 301, for example, having a concave region 303 and a convex region 305. Referring to FIG. 4, in another embodiment, the insert 107 is a rectangular prism, for example, being devoid of the point 205. Other suitable features of the insert 107 include, but are not limited to, being cuboid, being rhomboid, being planar or having planar portions, being non-planar or having non-planar portions, having a complex geometry (a geometry not defined by a common geometric term), having perpendicular corners, having non-perpendicular corners, or a combination thereof. In one embodiment, one or more surfaces of the insert 107 corresponds/resembles one or more features of the bucket preform 103, such as the geometry of the dovetail cavity 101 and/or the geometry of the dovetail shank 105.

The insert 107 is fabricated by any suitable technique capable of achieving the desired geometry. In one embodiment, the insert 107 is fabricated by laying a plurality of plies 307 (see FIG. 3). Additionally or alternatively, in one embodiment, the insert 107 is fabricated by casting, molds, foam, machining, laser printing, stereolithography, or a combination thereof. In one embodiment, the insert 107 is fabricated of a material permitting it to be re-used with or without intermediate treatments, such as cleaning and/or re-surfacing. Alternatively, the insert 107 becomes integral with the dovetail cavity 101 and/or is destroyed during the process 100.

The insert 107 includes any suitable material that is compatible with the bucket preform 103. In one embodiment, the insert 107 includes a porous substance, such as a foam material, a ceramic foam material, a ceramic matrix composite foam material, a foam containing alumina, silica, boron carbine, silicon carbide, titania, or a combination thereof. The porosity is any suitable porosity, such as, by volume, greater than 0%, greater than 5%, greater than 10%, greater than 20%, greater than 40%, between 0% and 5%, between 5% and 10%, between 20% and 40%, or any suitable combination, sub-combination, range, or sub-range therein.

In one embodiment, the insert 107 is fabricated prior to the positioning of the insert 107 within the dovetail cavity 101 (step 102). In an alternate embodiment, the dovetail cavity 101 forms a mold for receiving the material for the insert 107 (step 102). The positioning of the insert 107 (step 102) includes providing the material for the insert 107 to the dovetail cavity 101 to form the insert 107 within the dovetail cavity 101. Providing the material for the insert 107 includes, but is not limited to, filling, pouring, spraying, or a combination thereof. For example, in an embodiment with the material for the insert 107 including the porous substance, the positioning of the insert 107 (step 102) includes spraying the ceramic matrix composite foam material into the dovetail cavity 101 to fill the dovetail cavity 101 with the ceramic matrix composite foam material. After providing the material for the insert 107 to the dovetail cavity 101, the material is set to form the insert 107 within the dovetail cavity 101.

The positioning of the insert 107 (step 102) prior to the forming of the ceramic matrix composite 115 (step 110) provides benefits during the process 100. For example, in an embodiment with the insert 107 being cured after the positioning of the insert 107 (step 102), the heating and/or the compaction permit(s) formation of uniform or substantially uniform thickness of the ceramic matrix composite turbine bucket 115 in the dovetail shank 105. In an embodiment with the insert 107 being cured before the positioning of the insert 107 (step 102), the insert 107 permits the pre-fabrication of the insert 107 to be closely monitored. In an embodiment with the insert 107 being destroyed and/or removed after the heating and/or the compaction, the material defining the dovetail cavity 101 is capable of being inspected. In one embodiment, the positioning of the insert 107 (step 102) permits melt infiltration to regions of the dovetail shank 105 that would not receive the melt infiltration through other techniques without the use of the insert 107, thereby permitting such processes to be used for fabrication of larger components.

Figure 5:
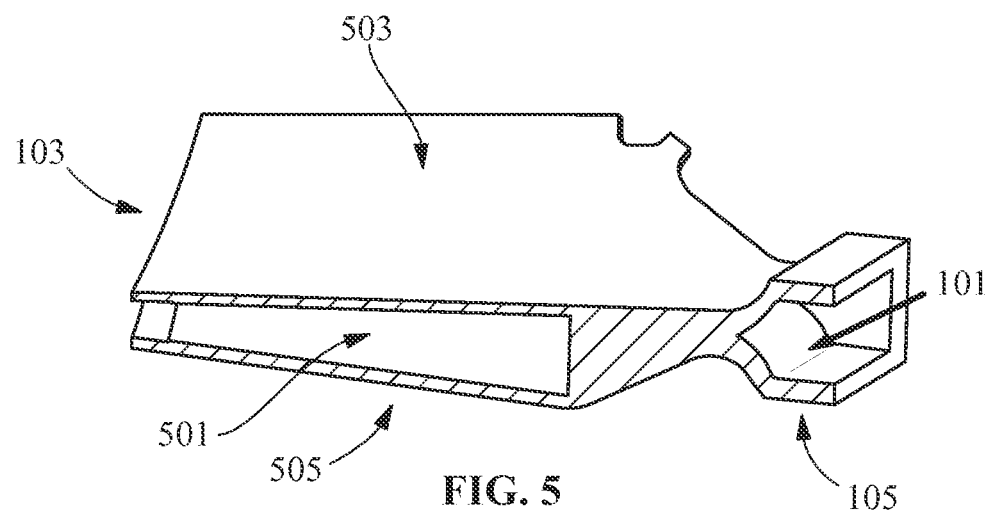
FIG. 5 is a cutaway perspective view of an embodiment of a bucket preform for a ceramic matrix composite turbine bucket, according to the disclosure.

Referring to FIG. 5, in one embodiment, the dovetail cavity 101 of the bucket preform 103 is substantially or entirely within the dovetail shank 105 and/or is separate from a bucket cavity 501 between a suction side 503 and pressure side 505 of the bucket preform 103. Alternatively, in one embodiment, the bucket preform 103 is solid between the suction side 503 and pressure side 505.

Figure 6:
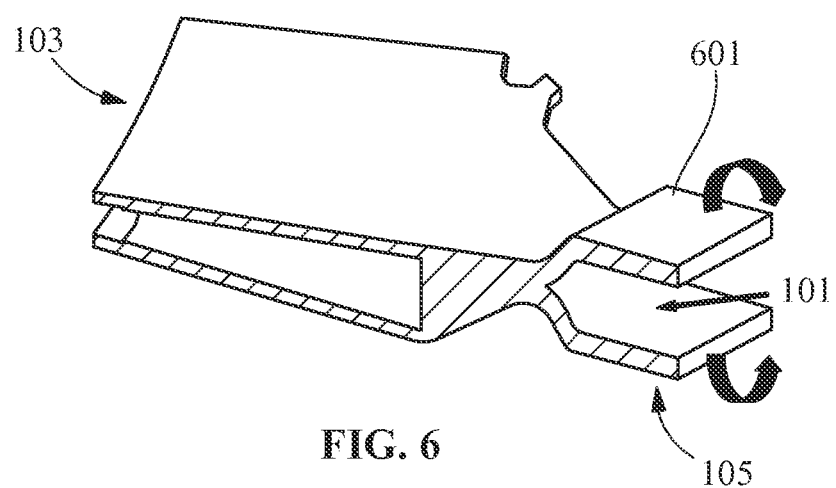
FIG. 6 is a cutaway perspective view of an embodiment of a bucket preform for a ceramic matrix composite turbine bucket, according to the disclosure.

Referring to FIG. 6, in one embodiment, the dovetail cavity 101 of the bucket preform 103 is capable of being enclosed by portions 601 of the dovetail shank 105 being adjusted, as shown, to enclose the insert 107 or any other suitable material positioned within the dovetail cavity 101.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process of producing a ceramic matrix composite turbine bucket, the process comprising:
   providing a bucket preform having a dovetail cavity, the dovetail cavity being enclosed within a dovetail shank of the bucket preform; then
   positioning an insert within the dovetail cavity; and then
   forming the ceramic matrix composite turbine bucket from the bucket preform and the insert, the forming comprising heating in a furnace, wherein the heating in the furnace provides melt infiltration and destroys the insert.

2. The process of claim 1, further comprising fabricating the insert prior to positioning the insert within the dovetail cavity.

3. The process of claim 1, wherein positioning the insert within the dovetail cavity further comprises providing a material for the insert to the dovetail cavity, then setting the material to form the insert within the dovetail cavity.

4. The process of claim 1, further comprising laying ceramic matrix composite plies to form the insert.

5. The process of claim 1, wherein the heating in the furnace draws melt infiltration from the insert to the dovetail shank, and the positioning permits melt infiltration to regions of the dovetail shank that would not receive the melt infiltration without the use of the insert.

6. The process of claim 1, wherein the insert has a point extending into the dovetail cavity.

7. The process of claim 1, wherein the insert is devoid of a point extending into the dovetail cavity.

8. The process of claim 1, wherein the insert includes a geometry selected from the group consisting of a cuboid geometry and a sloped geometry at least partially corresponding to a dovetail shank of the ceramic matrix composite turbine bucket.

9. The process of claim 1, wherein the ceramic matrix composite turbine bucket further comprises a blade cavity, the blade cavity being separate from the dovetail cavity.

10. The process of claim 1, further comprising compacting the ceramic matrix composite turbine bucket with the insert positioned in the dovetail cavity.

11. The process of claim 1, further comprising outgassing the ceramic matrix composite turbine bucket with the insert positioned in the dovetail cavity.

12. The process of claim 1, wherein the insert includes a foam material.

13. The process of claim 12, wherein the foam material includes a porosity of greater than 0%, by volume.

14. The process of claim 1, wherein the insert comprises an insert material selected from the group consisting of a foam material, a ceramic foam material, a ceramic matrix composite foam material, and a plurality of ceramic matrix composite plies.

15. The process of claim 1, wherein the insert comprises a ceramic matrix composite foam and positioning the insert within the dovetail cavity comprises spraying the ceramic matrix composite foam into the dovetail cavity.

16. The process of claim 15 further comprising setting the ceramic matrix composite foam in the dovetail cavity.

\* \* \* \* \*